BEST AVAILABLE COPY 607334 313

March 5, 1968 J. S. KAMBORIAN ET AL Re. 26,355

LASTING MACHINE HAVING COOLED CLAMP

Original Filed March 5, 1963 15 Sheets-Sheet 1

INVENTORS
Jacob S. Kamborian
Michael M. Becka
Robert B. Dunlap
BY Albert Gordon ATT'Y

LASTING MACHINE HAVING COOLED CLAMP

Original Filed March 5, 1963 15 Sheets-Sheet 2

LASTING MACHINE HAVING COOLED CLAMP

Original Filed March 5, 1963 15 Sheets-Sheet 3

LASTING MACHINE HAVING COOLED CLAMP

Original Filed March 5, 1963 15 Sheets-Sheet 4

LASTING MACHINE HAVING COOLED CLAMP

Original Filed March 5, 1963 15 Sheets-Sheet 5

LASTING MACHINE HAVING COOLED CLAMP

Original Filed March 5, 1963 15 Sheets-Sheet 7

LASTING MACHINE HAVING COOLED CLAMP

Original Filed March 5, 1963 15 Sheets-Sheet 8

LASTING MACHINE HAVING COOLED CLAMP

Original Filed March 5, 1963 15 Sheets-Sheet 9

LASTING MACHINE HAVING COOLED CLAMP

Original Filed March 5, 1963 15 Sheets-Sheet 10

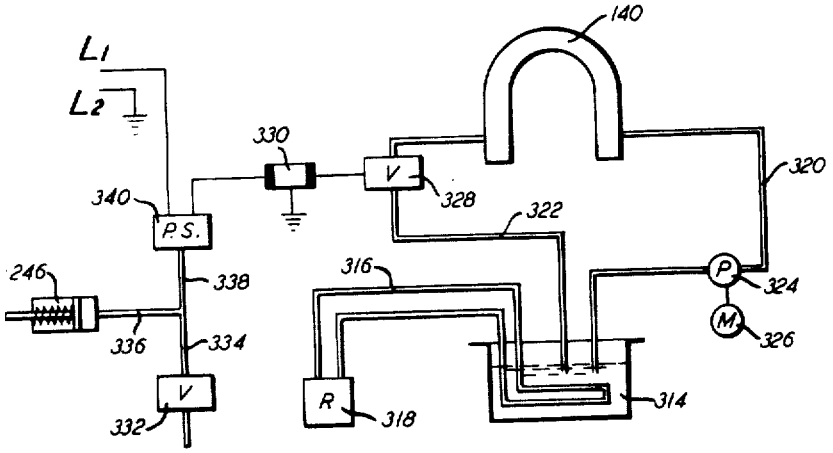
FIG.-19
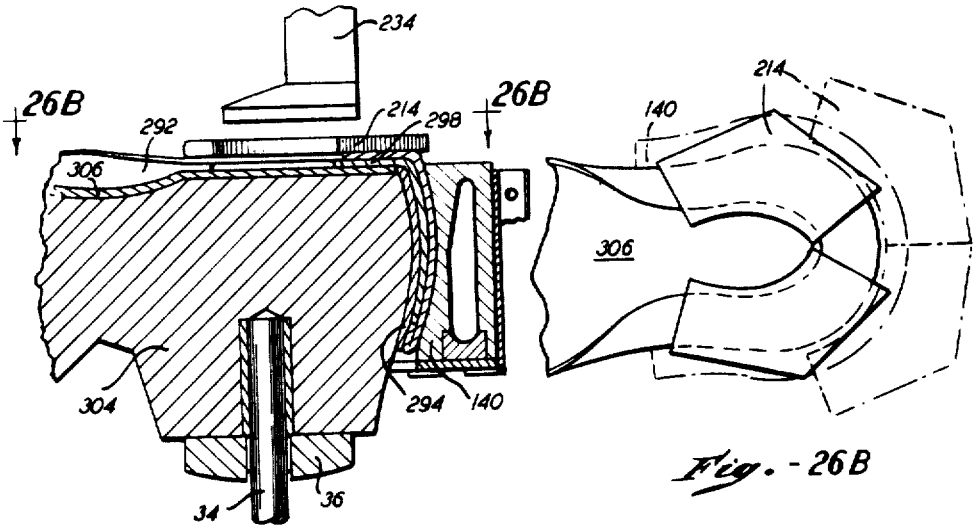
Fig.-26A
Fig.-26B

LASTING MACHINE HAVING COOLED CLAMP

Original Filed March 5, 1963 15 Sheets-Sheet 13

United States Patent Office

Re. 26,355
Reissued Mar. 5, 1968

26,355

LASTING MACHINE HAVING COOLED CLAMP

Jacob Simon Kamborian, 70 Crestwood Road, West Newton, Mass. 02165, and Michael M. Becka, Cambridge, and Robert B. Dunlap, Medway, Mass.; said Becka and said Dunlap assignors to said Kamborian Original No. 3,228,046, dated Jan. 11, 1966, Ser. No. 262,874, Mar. 5, 1963. Application for reissue Aug. 4, 1966, Ser. No. 607,334
22 Claims. (Cl. 12—10.5)

Matter enclosed in heavy brackets [ ] appears in the original patent but forms no part of this reissue specification; matter printed in italics indicates the additions made by reissue.

In application Serial No. 125,691, filed July 21, 1961, now Patent No. 3,130,429 there is disclosed a heel seat lasting machine that may be used to practice the method disclosed in application Serial No. 80,919, filed January 5, 1961, now Patent No. 3,144,670. The method comprises the step of mounting a shoe upper on a last having an insole located on its bottom with a shoe stiffener interposed between the last and upper. The stiffener has the characteristic of being stiff and rigid at ambient temperatures, of becoming flaccid and moldable when heated a predetermined amount above ambient temperatures, and of reverting to its stiff and rigid state when cooled back to ambient temperatures. The stiffener is in its solid and flaccid condition when mounted on the last and is caused to conform to the shape of the last by instrumentalities that include a clamping pad for clamping the upper and stiffener against the last. While so clamped, the margin of the upper is wiped against the shoe insole, and after the stiffener has cooled sufficiently to revert to its stiff and rigid condition, the shoe is released from clamping and wiping instrumentalities and the other instrumentalities of the machine.

Since the instrumentalities cannot be released from the shoe until the stiffener has reverted to its original condition, the cycle of the machine can be appreciably shortened if the stiffener is artificially cooled after it is caused to conform to the shape of the last. In the instant invention, this cooling is effectuated by cooling the clamping pad below ambient temperatures by forcing fluid under pressure into a cavity in the pad. This fluid cools the stiffener by conduction through the pad and also expands the pad against the last to provide a greater and more uniform pressure of the pad against the last.

In the illustrative embodiment of the invention, the clamping pad of the machine disclosed in the aforementioned Patent No. 3,130,429, which takes the form of a U-shaped heel clamping pad that is brought to bear against the heel of the upper and last with a counter having the aforementioned characteristics interposed between the heel of the upper and the heel of the last, is modified. The fluid is supplied in the form of a liquid that is refrigerated below ambient temperatures and is forced into the pad cavity with sufficient pressure to expand the pad against the last after the pad has been forced against the heel of the last. The pad used is made of a deformable material, preferably rubber, and has a relatively rigid shield disposed about its exterior surface so that the expansive forces created by the liquid will be directed inwardly against the last.

Referring to the accompanying drawings:

FIGURE 19 is a schematic representation of a first arrangement for forcing liquid into the clamping pad;

FIGURE 26A is a vertical section showing the heel of the last and shoe at the completion of the wiping operation; and FIGURE 26B is a view taken on the line 26B—26B of FIGURE 26A.

Figure 1:
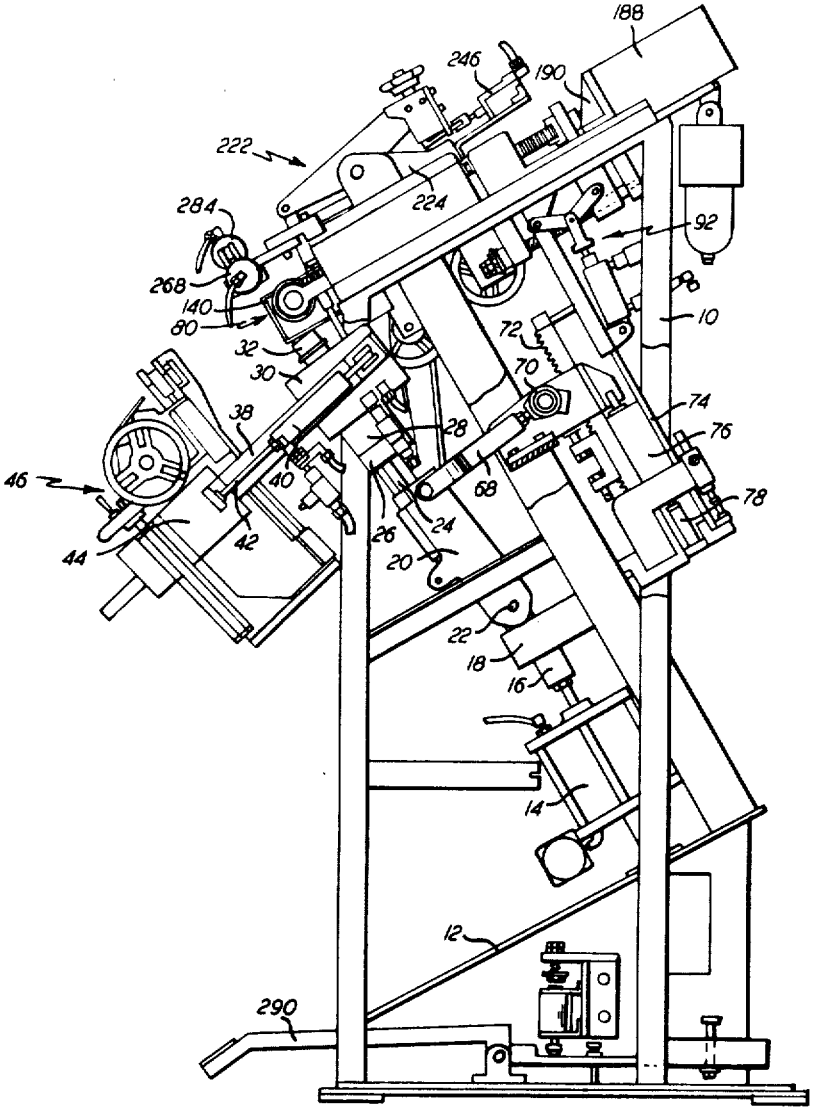
FIGURE 1 is a side elevation of the machine.
Figure 2:
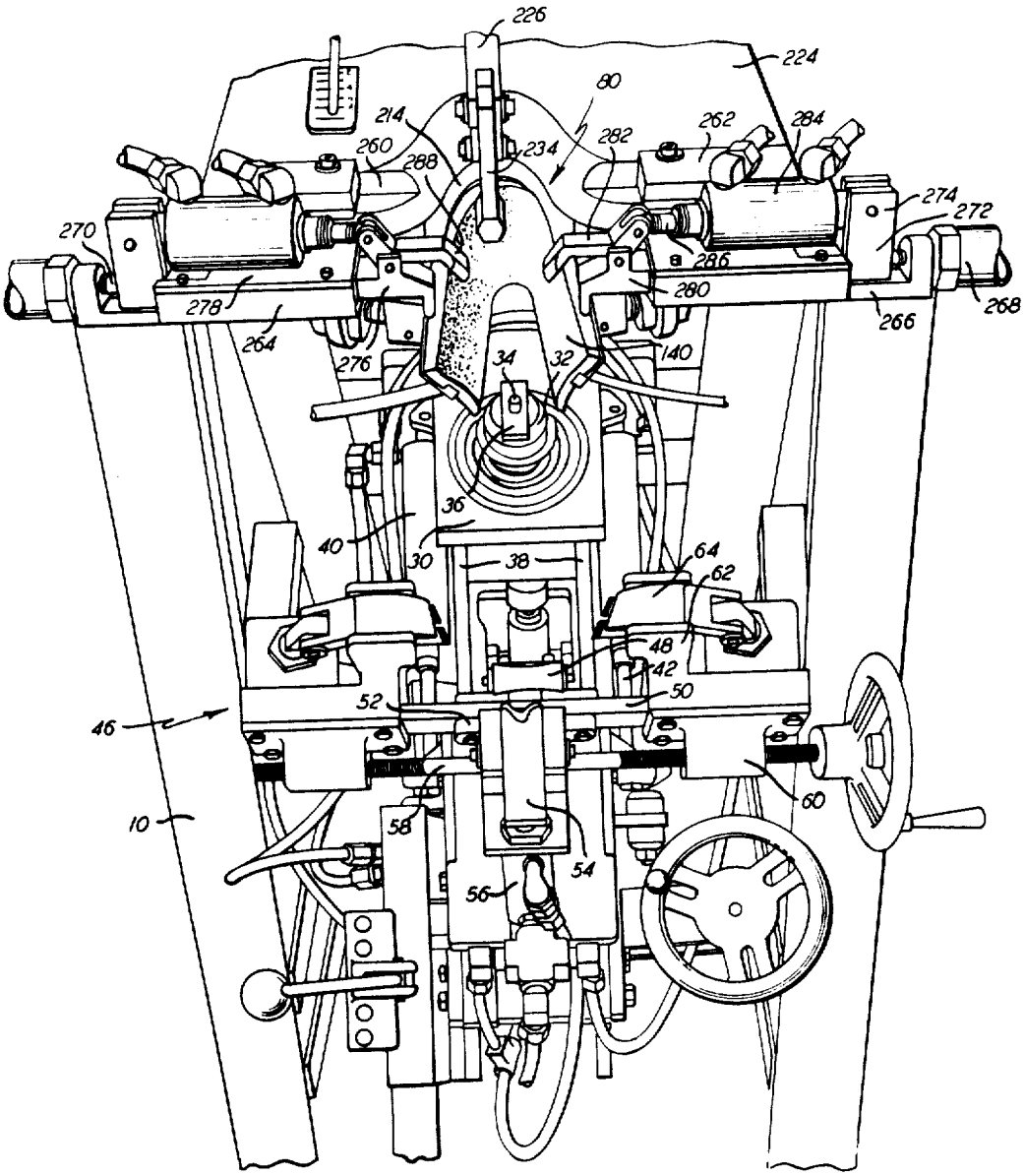
FIGURE 2 is a front elevation of the machine.

Referring to FIGURES 1 and 2, the machine comprises a frame 10 having an inclined plate 12. An air actuated motor 14, mounted on the plate 12, has a piston rod 16 extending upwardly therefrom that is vertically guided in a guide bearing 18 secured to the frame. A post 20 is pivotally secured to the piston rod 16 by a pivot 22. A rod 24 is received in a socket in the upper end of the post 20. The rod 24 has a collar 26 mounted thereon and a sleeve 28 is mounted on the rod 24 and rests on the collar 26. A swivel block 30 is pivotally mounted on the sleeve for swinging movement about the axis of the rod 24 and the sleeve 28 with the bottom of the block resting on the collar 26.

Figure 3:
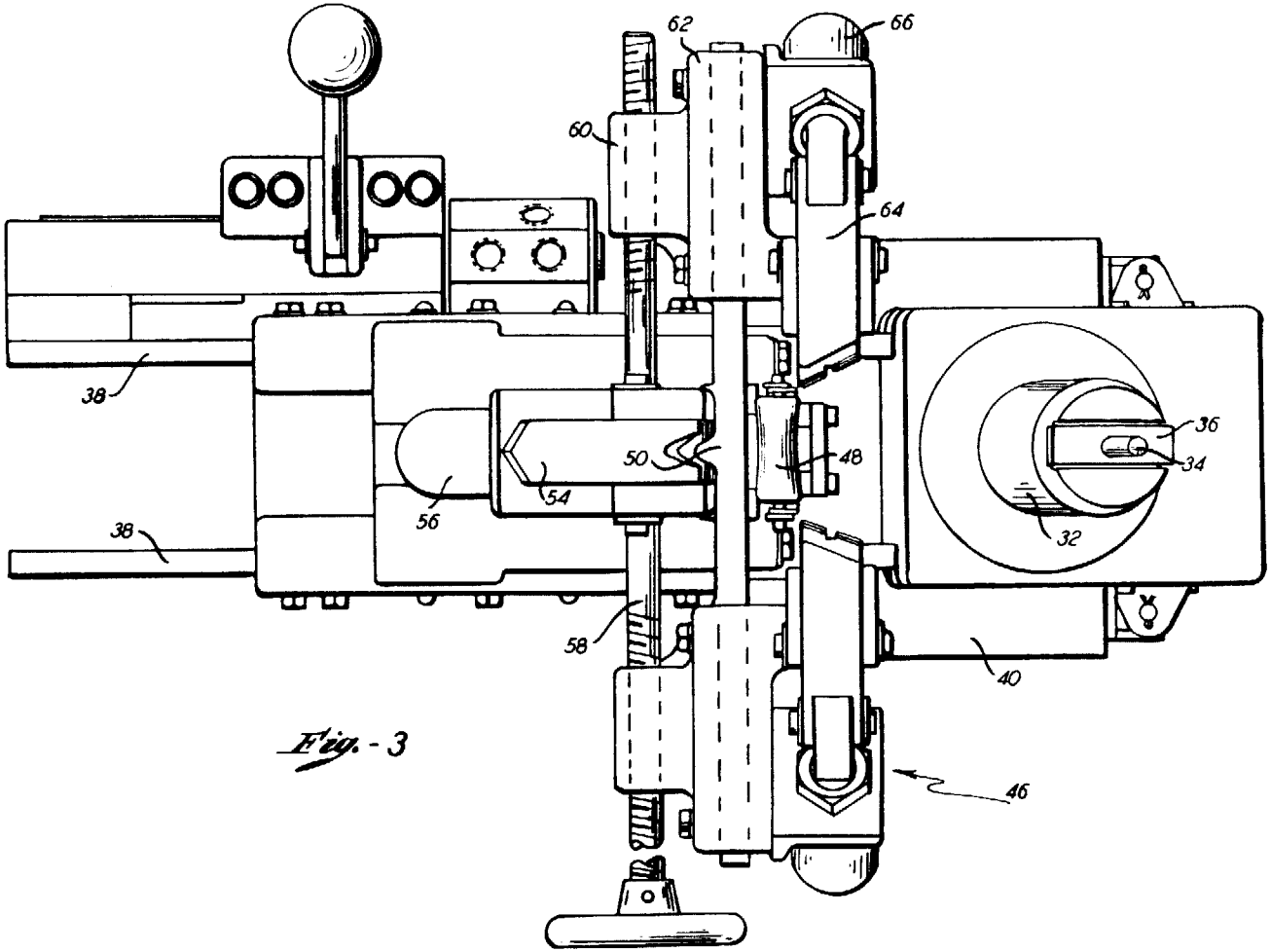
FIGURE 3 is a top plan view of an upper tensioning mechanism and a shoe support.
Figure 5:
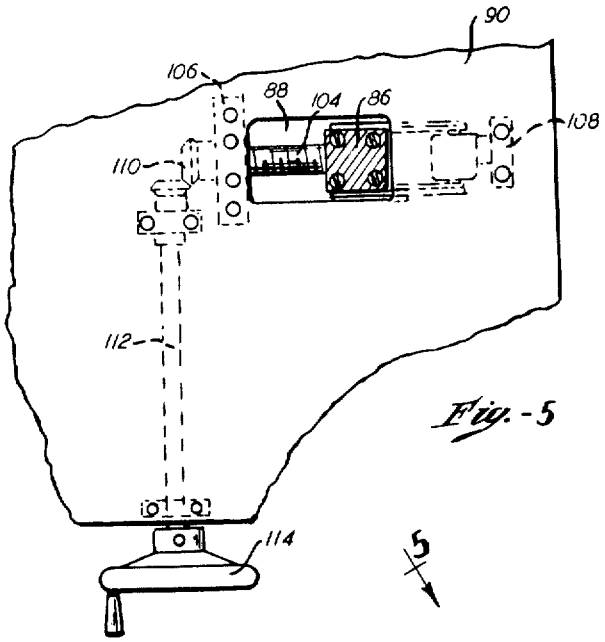
FIGURE 5 is a view taken on the line 5—5 of FIGURE 4.

A last pin holder 32 is mounted in the upper end of the rod 24 and a last pin 34 is fastened in an axial hole in the last pin holder and projects upwardly therefrom (see FIGURE 3). The last pin holder 32 receives a last supporting plate 36 on its upper surface, the plate 36 having a flat upper surface and a hole through which the last pin 34 projects.

Parallel bars 38 are rigidly connected to the swivel block 30 to extend forwardly thereof. An air operated motor 40 is pivotally connected to each bar 38 to extend forwardly of the block 40. The piston rods 42 of the motors 40 are rigidly connected to a head 44 forming part of an upper tensioning unit 46 that is slidably mounted on the bars 38.

The unit 46 (FIGURES 2 and 3), has a toe rest roller 48 mounted therein at its forward end and a bar 50 to which a toe pincers bracket 52 is secured. A toe pincers 54 is mounted on the bracket 52. The pincers 54 comprises a lower stationary jaw and an upper movable jaw that can be moved from its normal open position to a closed position against the stationary jaw by an air operated motor 56. A shaft 58 extending below the bracket 52 has right and left hand threads at its opposite ends whereby it is screwed into bosses 60 that are secured to forepart pincer brackets 62. The brackets 62, which are slidably supported on the bar 50, support forepart pincers 64. Each forepart pincers 64 comprises a fixed jaw rigidly connected to a bracket 62 and a movable jaw that is pivotally connected to an air operated motor 66, so that it may be moved toward and away from the fixed jaw. An air actuated motor (not shown) is connected to the bar 50 to effect heightwise movement of the pincers 54 and 64 in unison.

The post 20 is pivotally connected to a pitman 68 (FIGURE 1). The pitman is drivingly connected by way of a crank 70 to a rack 72 mounted on a D-shaped rack support 74 that is slidably mounted in the frame 10. An air operated motor 76, mounted in the frame 10, has a piston rod 78 connected to the rack frame 74 to effect heightwise movement of the rack 72 and hence swinging movement of the post 20 about the pivot 22.

Figure 4:
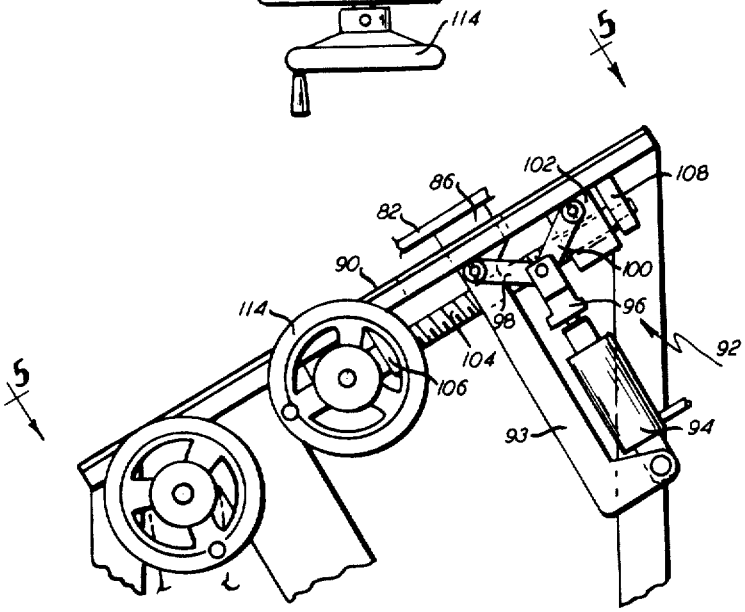
FIGURE 4 is a side elevation view of a mechanism for moving the wiping and clamping instrumentalities from an initial out-of-the-way position to a working position.

A heel seat lasting unit 80 is mounted in the frame 10 rearwardly of the upper tensioning unit 46. Referring to FIGURES 4 through 10, the unit 80 comprises a main slide plate 82 slidably mounted for forward and rearward movement on gibs 84 in the frame 10 (see FIGURE 7). A block 86 is secured to the plate 82 and is movable in a slot 88 formed in a table 90, which table forms a part of the frame 10. A floating actuator 92 is secured to the block 86 (FIGURE 4). The actuator 92 comprises a bar 93 depending from and rigid with the block 86. An air operated motor 94 is pivoted to the bars 93 and has a piston rod 96 extending upwardly therefrom. A pair of toggle links 98 and 100 are pivoted at their adjoining ends to the piston rod 96 and are respectively pivoted at their other ends to the bar 93 and to a nut 102. A screw 104 is rotatably mounted in hangers 106 and 108 depending from the table 90, extends through a clearance opening in the bar 93 and is threaded into the nut 102. The screw 104 is connected through a gear train 110 and a shaft 112 to a wheel 114. Thus, rotation of the wheel 114 causes the nut 102 to move axially of the screw 104 and causes the floating actuator 92, the block 86, the main slide plate 82 and the members carried thereby to move forwardly and rearwardly in the frame. Actuation of the motor 94 to open or close the toggle linkage formed by the members 96, 98 and 100 will also cause the main slide plate 82 and the members carried thereby to move forwardly and rearwardly in the frame, forward movement of the plate 82 causing the heel seat lasting unit 80 to be moved from an out-of-the-way position to a working position as described below.

Figures 8, 9:
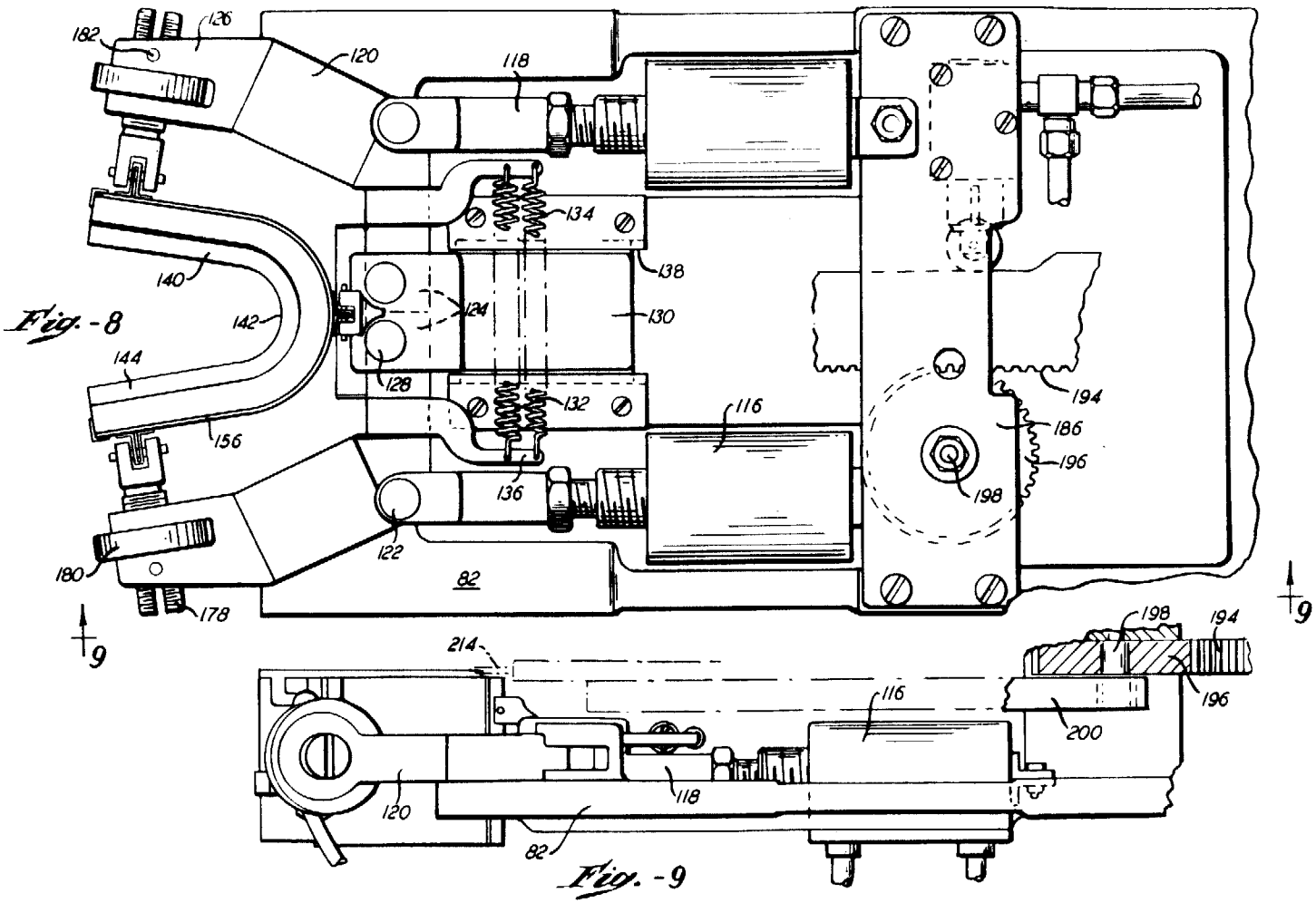
FIGURE 8 is a top plan view of the heel clamp and the heel clamp actuating means.
FIGURE 9 is a view taken on the line 9—9 of FIGURE 8.

A pair of air actuated motors 116 are mounted on the plate 82 (FIGURES 8 and 9). Each motor 116 has a piston rod 118 that is pivotally connected to a lever 120 by a pivot 122. The levers 120 have legs 124 extending toward each other and legs 126 extending forwardly and divergently from the pivots 122. The legs 124 are pivotally connected by pivots 128 to a side plate 130. A pair of tension springs 132 and 134 are connected at their opposite ends to arms 136 that are fixed to the legs 124. The springs force the levers 120 about the pivots 122 to the position shown in FIGURE 8 where the contiguous faces of the legs abut each other. The slide plate 130 is slidably mounted in gibs 138 mounted on the plate 82.

The machine includes a U-shaped clamping pad 140 made of an expandable, deformable material such as rubber having a bight 142 and a pair of legs 144 extending forwardly of the bight, see FIGURES 14–18. The pad 140 has a cavity 146 that extends through the bight 142 and terminates short of the forwardmost ends of the legs 144. The inner peripheral surface 148 of the pad 140 is shaped so that it is substantially complemental to the outer periphery of the heel end of a last. A connector pin 152 is embedded in each leg 144 to extend outwardly of the surface 150. A nipple 154 is also embedded in a port 155 in each leg 144 below the pins 152 to extend outwardly of the surface 150, each nipple being in communication with the cavity 146.

A shield 156, made of spring steel, is fitted about the outer peripheral surface 150 of the pad 140. The shield has inwardly projecting tabs 158 that underlie the pad, corner flanges 160 that bear against the forward surfaces 162 of the pad legs 144, bayonet slots 164 that receive the pins 152, cut-outs 166 to provide clearance for the nipples 154, a flange 168 extending rearwardly of the pad bight 142, and flanges 170 extending outwardly of the pad legs 144. The slide plate 130 has a forwardly extending, forked projection 172 that receives the flange 168 and which is pinned to the flange 168 by a pin 174. The forward end 176 of the slide plate 130 below the projection 172 is also forked to receive the flange 168. The lever legs 126 have studs 178 slidably mounted therein, and each lever leg 126 is forked at its forward end to embrace a knob 180 that is threaded onto each stud 178. The outer end of each stud 178 is forked to form a mounting bracket that receives a pin 182 mounted in each lever leg 126, so that rotation of each knob 180 imparts a rectilinear inward or outward movement of a stud 178 with respect to its associated lever leg 126. The inner end of each stud 178 is forked to receive a flange 170 and is pinned thereto by means of a pin 184.

The wall 149 between the cavity 146 and the inner peripheral surface 148 is of lesser thickness than the walls between the cavity and the other surfaces of the pad.

Figure 6:
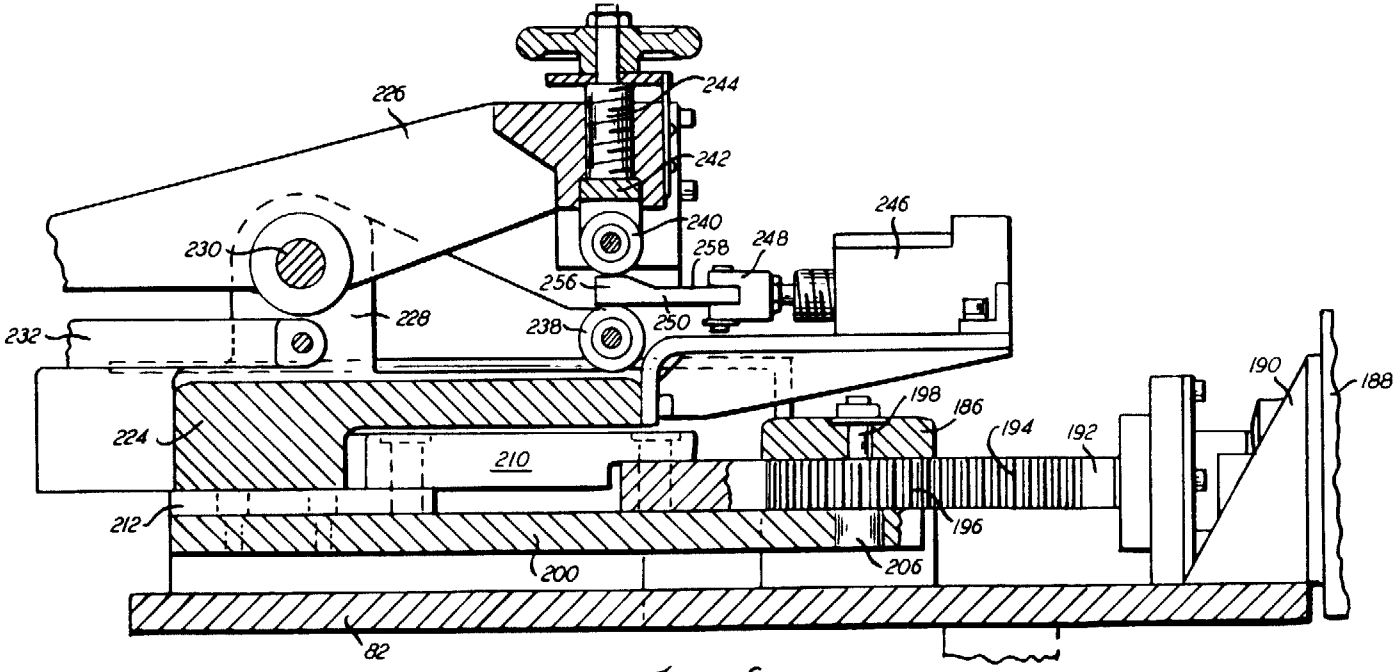
FIGURE 6 is a side elevation partly in section of a wiper actuating means and a hold-down actuating means.
Figure 7:
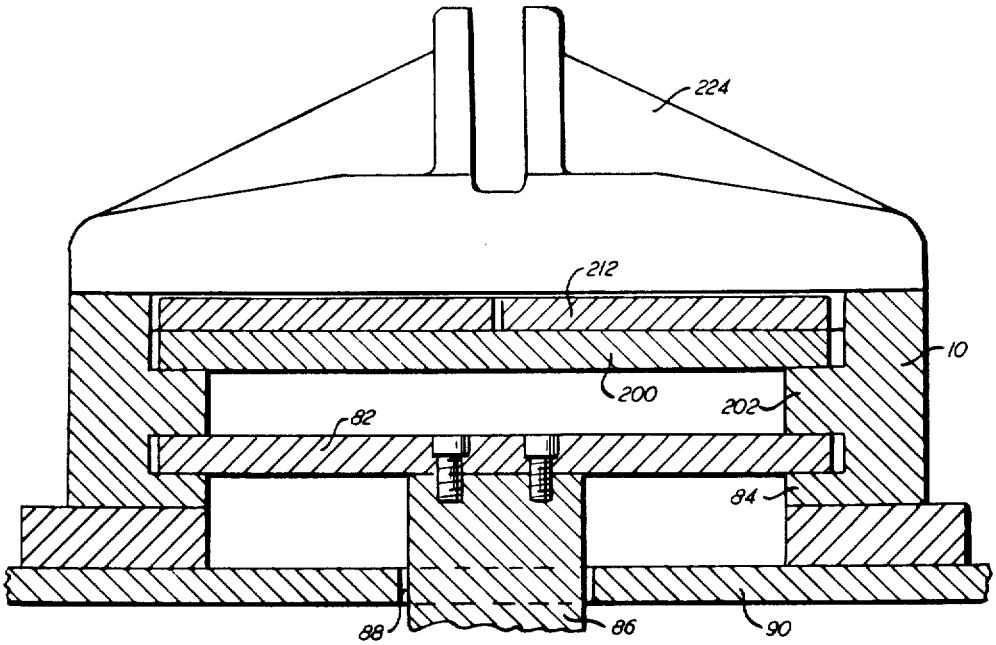
FIGURE 7 is a section showing the relationship of the clamp driving mechanism, the wiper actuating mechanism and the hold-down actuating mechanism as they are mounted in the machine.
Figure 10:
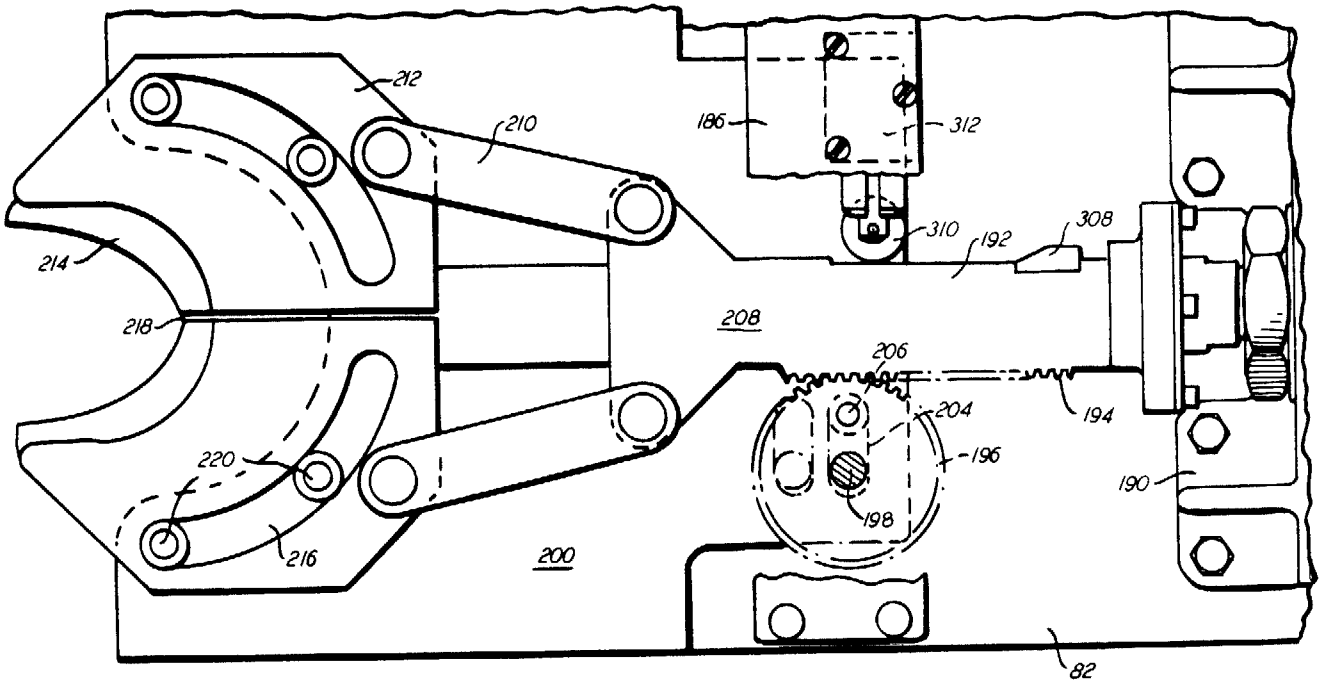
FIGURE 10 is a top plan view of the wipers and the wiper actuating means.

A bridge 186 is anchored at its ends to the sides of the main slide plate 82 and extends thereover (FIGURES 6, 8 and 10). An air operated motor 188 is secured to a rib 190 at the rear of the main slide plate 82. The piston rod 192 of the motor 188 has a rack 194 thereon that is in mesh with a gear 196 rotatably mounted beneath the bridge 186 on a pin 198 fixed in the bridge. A wiper supporting plate 200 is slidably supported on gibs 202 in the frame 10 (FIGURES 7 and 10). The plate 200 has a slot 204 extending transversely to the rack 194 which receives an eccentrically mounted crank pin 206 depending from the gear 196. The piston 192 has an enlargement 208 at its forward end to which are pivoted the ends of links 210. The opposite ends of the links 210 are pivoted to wiper cams 212, and a wiper 214 is mounted in each wiper cam. The wiper cams 212 have curved cam slots 216 with a center of curvature at the point where the wipers diverge from each other, indicated by the numeral 218 in FIGURE 10. The wiper cams rest on the plate 200, and the plate 200 has rollers 220 extending upwardly therefrom into the cam slots 216.

Figure 11:
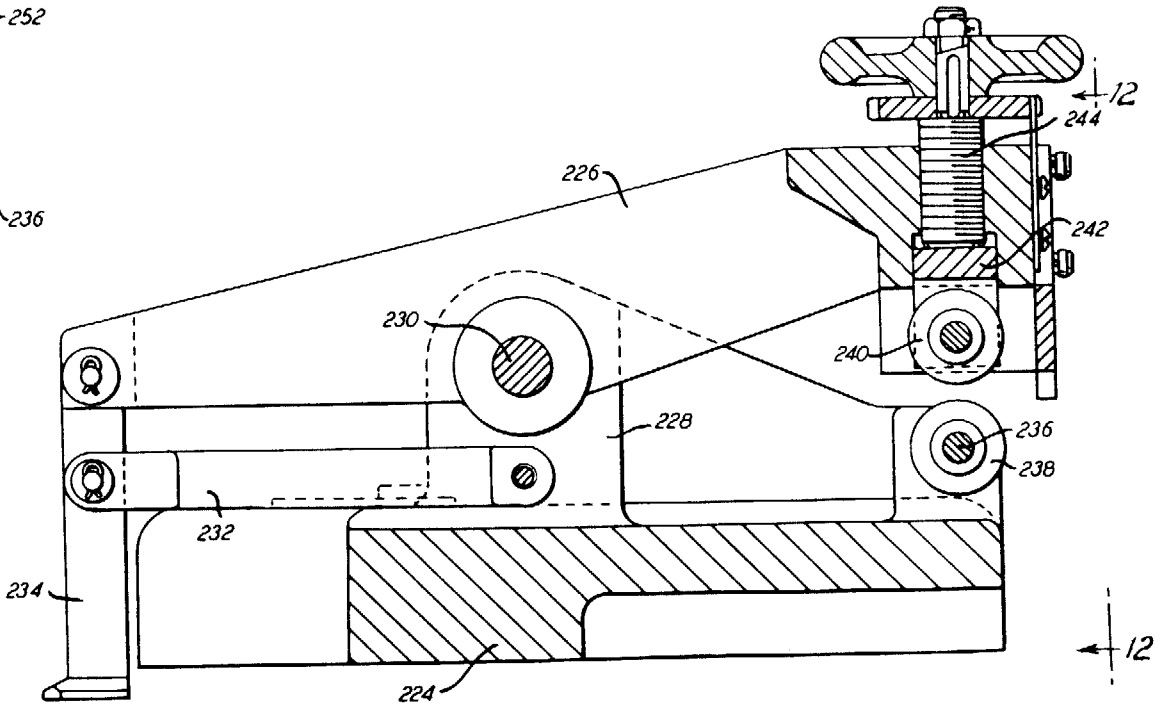
FIGURE 11 is a side elevation view of the hold-down.
Figure 12:
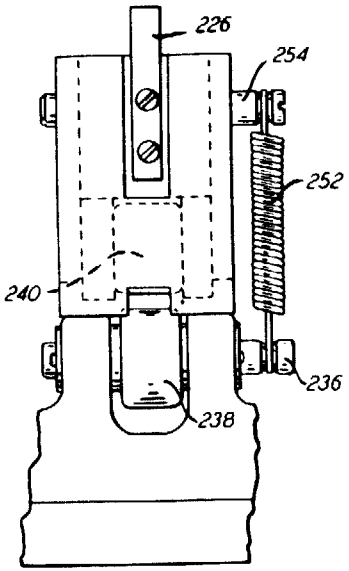
FIGURE 12 is a view taken on the line 12—12 of FIGURE 11.
Figure 14:
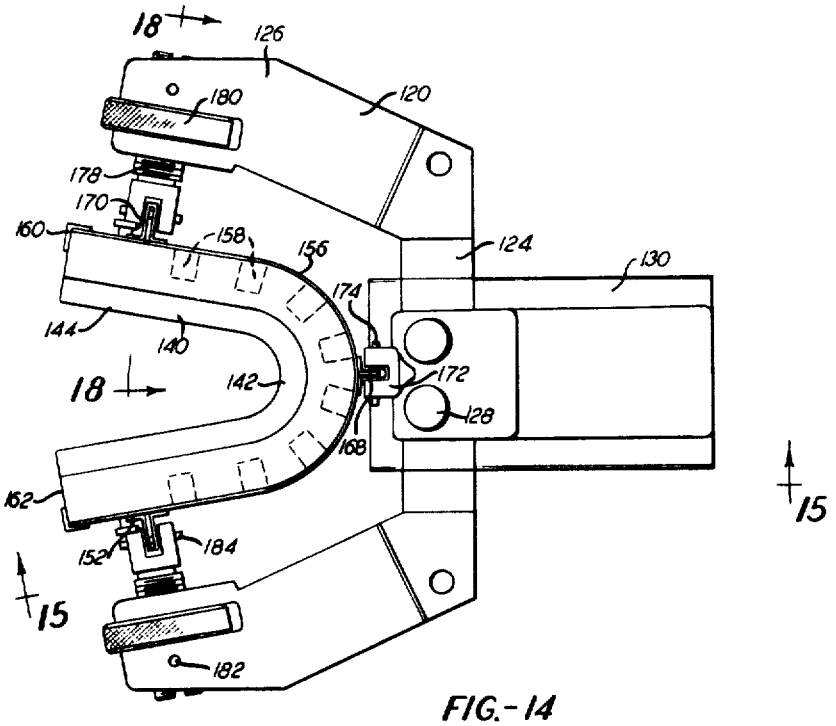
FIGURE 14 is a top plan view showing how the clamping pad is mounted in the machine.
Figure 15:
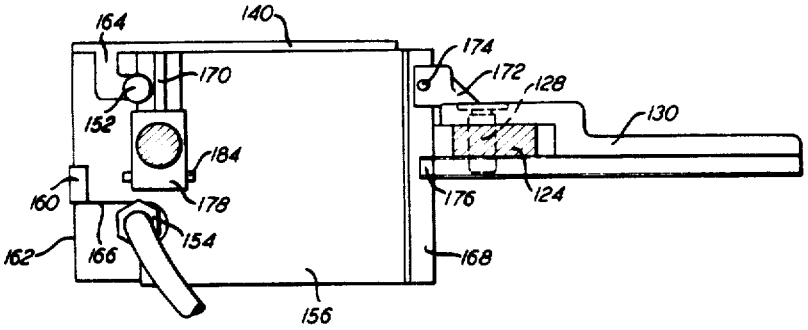
FIGURE 15 is a view taken on the line 15—15 of FIGURE 14.
Figure 16:
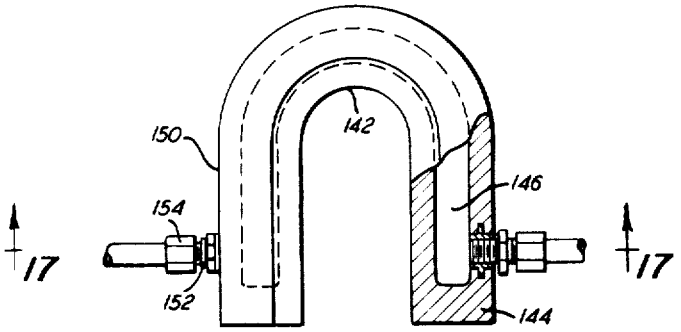
FIGURE 16 is a top plan view, partly in section, of the clamping pad.
Figure 17:
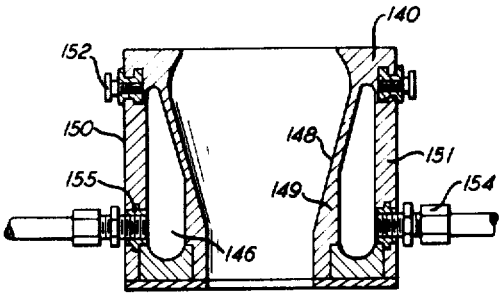
FIGURE 17 is a section taken on the line 17—17 of FIGURE 16.
Figure 18:
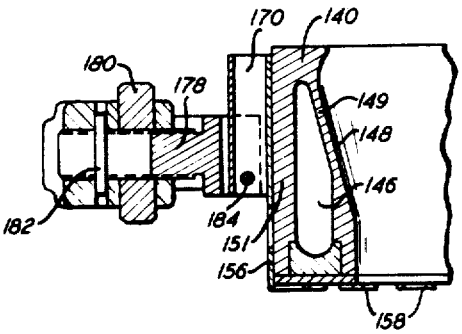
FIGURE 18 is a section taken on the line 18—18 of FIGURE 14.

A hold-down unit 222 is mounted on a frame cover 224 located above the plates 82 and 200 and the wiper cams 212, see FIGURES 1 and 7. The unit 222 comprises a lever 226 pivoted to a clevis 228 on the cover 224 by a pivot 230, see FIGURES 6 and 11. A link 232 is pivoted to the cover 224 below the pivot 230, and both the lever 226 and the link 232 are pivotally connected to a hold-down foot 234. The lever 226, link 232 and foot 234 thus form a parallel linkage mechanism whereby counterclockwise movement of the lever 226 (FIGURE 11) imparts a substantially rectilinear downward movement to the foot 234 and clockwise movement of the level 226 imparts a substantially rectilinear upward movement to the foot 234.

A pin 236 is rotatably mounted in the cover 224 rearwardly of the pivot 230, and a roller 238 is affixed to the pin 236. A roller 240 is rotatably mounted in a clevis 242 that is slidably mounted for up and down movement at the rear end of the lever 226 opposite the roller 238. A screw 244 bears against the upper surface of the clevis 242 to limit the upward movement of the clevis 242 in the lever 226.

An air operated spring return motor 246 is secured to the cover 224. The piston rod 248 of the motor 246 has a cam 250 secured thereto that is interposed between the rollers 238, 240. A tension spring 252 extending from the pin 236 to a pin 254 fixed to the lever 226 urges the roller 240 against the cam 250. The cam 250 has a high portion 256 that is normally interposed between the rollers 238, 240. The actuation of the motor 246 to bring a low portion 258 of the cam between the rollers will cause the spring 252 to move the roller 240, which acts as a cam follower, downwardly against the cam portion 258, swing the lever 226 clockwise (FIGURE 11), and thereby raise the hold-down foot 234, for a purpose that is explained below.

Referring to FIGURE 2, right angled recesses 260 are provided at the forward end of the cover 224 on opposite sides of the holddown foot 234. A mounting plate 262 is adjustably connected to each recess 260. A gib plate 264 in connected to and extends forwardly of each mounting plate 262, and a bracket 266 is connected to and extends outwardly of each gib plate 264. An air operated motor 268 is connected to and extends outwardly of each bracket 266. The piston rod 270 of each motor 268 is connected to an L-shaped slide bar 272 having an upright leg 274 and a prone leg 276. The prone leg 276 of each slide bar 272 is slidably mounted in a gib plate 264 beneath a cover plate 278. The inner end of each slide bar 272 is formed into the stationary jaw 280 of a breast line pincers 282. An air actuated motor 284 is pivotally connected to and extends inwardly of the upright leg 274 of each slide bar 272. The piston rod 286 of each motor 284 is pivotally connected to the movable jaw 288 of a pincers 282, each jaw 288 being pivotally connected intermediate its ends to a slide bar 272.

Although the apparatus can be used to assemble an upper on a last and heel seat last the upper onto an insole, it has particular utility in carrying out a method similar to that disclosed in the aforementioned pending application Serial No. 80,919. In the referred to method, a flaccid counter coated on both of its surfaces with adhesive is inserted in a pocket formed between an upper and a liner at the heel end of the upper, the upper is draped about the last tensioning forces are applied at the toe end of the upper to wrap the upper about the heel end of the last and initiate the molding of the counter to the shape of the last, the last is moved to a heel seat lasting position and forced upwardly against a hold-down, upward tensioning forces are applied at the toe end of the upper to assemble the upper on the last, a clamping force is applied at the heel of the last to maintain the upper stationary on the last and to complete the molding of the counter to the shape of the last, and the margins of the upper and counter are wiped down onto an insole located on the bottom of the last to thereby unite the lasted margin of the upper to the insole by adhesively bonding the counter to the upper and insole.

In setting up the machine for a particular size of last, the knobs 180 are rotated to move the pad legs 144 toward or away from each other to set the contour of the pad 140 in accordance with the contour of the shoe heel that is to be lasted. In addition, the adjustments described in pending application Serial No. 107,156, filed May 2, 1961, are made to adjust the spacing between the forepart pincers 64, the heightwise position of the upper tensioning unit 46 with respect to the last pin 34 at the upper end of the rod 24, the position of the hold-down foot 234 which should be positioned below the wipers 214 and amount that is dependent on the thickness of the upper margin and counter, the out-of-the-way position of the heel seat lasting unit 80, the position of the upper tensioning unit 46 on the bars 38 and the heightwise position of the toe rest roller 48. In addition, the spacing between the breast line pincers 282 is adjusted in the manner described in the aforementioned application Serial No. 125,691.

An automatically operated pneumatic control system, disclosed more fully in the aforementioned application Serial No. 125,691, is provided to cause the machine to go through a cycle. The system is actuated in response to the depression of a foot operated pedal 290 (FIGURE 1).

Figure 13:
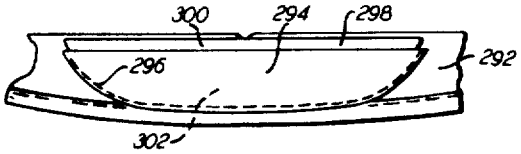
FIGURE 13 is a view of the counter inserted in a counter pocket in the heel portion of the upper.

A shoe upper 292 is provided having a liner 294 united thereto by a seam 296 at the heel end of the upper, see FIGURE 13. A shoe stiffener or counter 298 is inserted in the pocker formed between the upper 292 and the liner 294 with an exposed portion 300 of the counter extending upwardly of the upper edge of the liner and a concealed portion 302 lying between the liner and upper. The counter material is made of a homogeneous thermoplastic material and has the characteristic of being stiff and rigid at ambient temperatures, of becoming soft and flaccid when heated above a predetermined temperature and of returning to its stiff and rigid state when cooled back below the predetermined temperature to ambient temperatures. The counter is coated on both of its surfaces with an adhesive which becomes sticky or tacky when heated above said predetermined temperature and reverts to its normal rigid, cohesive condition when cooled below the predetermined temperature back to ambient temperatures.

The counter, upper and liner assembly is heated to a temperature sufficient to render the counter soft and flaccid. This may be done in an apparatus similar to that disclosed in application Serial No. 80,874, filed February 21, 1961, now Patent No. 3,115,651. This assembly is then draped about a last 304 having an insole 306 mounted on its bottom. The last is placed bottom-up on the last supporting plate 36 with the pin 34 entering the conventional last pin hole in the last. The toe portion of the upper and last is supported on the toe roller 48, the toe end of the upper is inserted between the jaws of the toe pincers 54 and the forepart portions of the upper margin are inserted between the jaws of the forepart pincers 64. At this time the upper end of the liner 294 is substantially level with the insole 306 and the upper surfaces of the counter 298 and upper 292 at the heel end of the last extend above the insole 306 as indicated in FIGURE 22B.

Figure 22A:
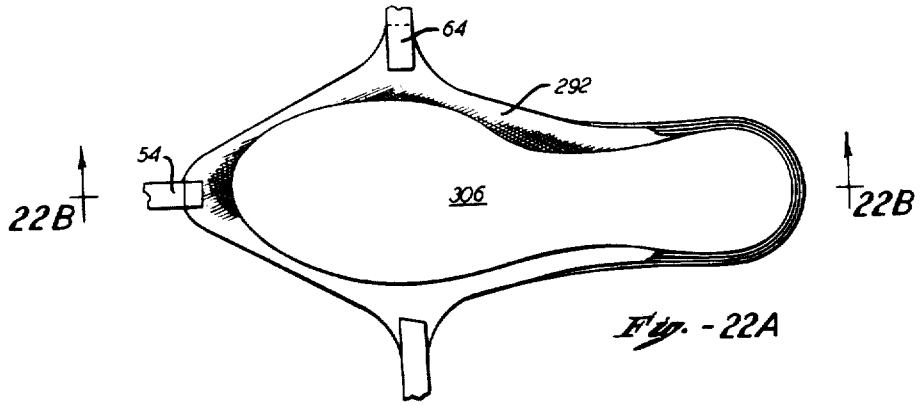
FIGURE 22A is a plan view of the shoe and last in an early stage of the machine cycle.
Figure 22B:
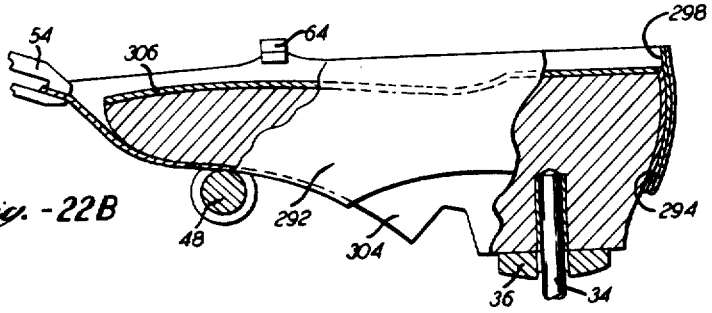
FIGURE 22B is a view taken on the line 22B—22B of FIGURE 22A.
Figure 23:
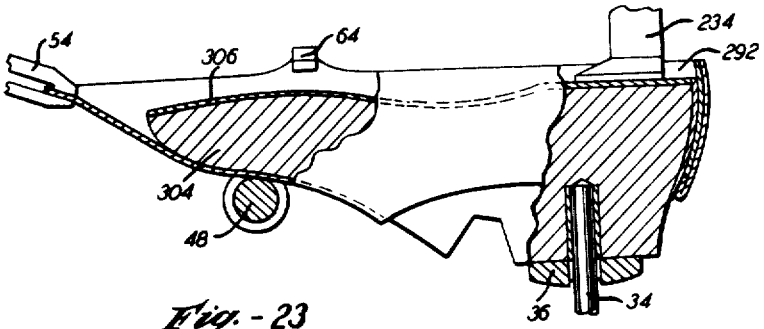
FIGURE 23 is a showing of the shoe and last in a later stage of the machine cycle.

The operator now depresses the pedal 290 to cause actuation of the motors 56 and 66 to respectively cause the toe pincers 54 and the forepart pincers 64 to grip the margin of the upper as indicated in FIGURES 22A and 22B. This is followed by actuation of the motors 40 to cause the upper tensioning unit 46, including the pincers 54 and 64, to move forwardly on the bars 338 to thereby horizontally stretch the upper in the direction of the toe of the last and cause a firm wrapping of the upper about the heel of the last and a tension force on the counter to start to mold it to the shape of the last. After this, the motor 76 is actuated to lower the piston rod 78 (FIGURE 1) and the rack support 74 to thereby swing the post 20 about the pivot 22 to a position where the shoe is adjacent to but not in engagement with the heel seat lasting unit 80 and the hold-down unit 222. In this position the post 20 is in alignment with the hold-down foot 234 but the insole 306 is below the bottom of the hold-down foot. In addition, in this position, the shoe upper and last are not in engagement with the heel clamping pad 140. In response to the lowering of the rack support 74, the motor 14 is actuated to raise the post 20 and thus move the last and shoe upwardly until the insole 306 bears against the hold-down foot 234. In this position the shoe and last are clamped between the hold-down foot 234 and the last supporting plate 36, as indicated in FIGURE 23, with the upwarldy facing surface of the insole slightly below the top surface of the clamping pad 140 and the bottom surfaces of the wipers 214.

The pincers 54 and 64 are now raised in unison by upward movement of the bar 50 through the motor (not shown) connected to it to thereby apply an upward tension to the margin of the upper 292 at its toe and forepart portions to thereby stretch the upper tightly on the last and assemble it in proper position for the subsequent heel seat lasting operation. Since the last and shoe are clamped at this time between the foot 234 and the plate 36, upward movement of the pincers will not shift the last.

Now the motor 94 on the floating actuator 92 is actuated to thereby raise the piston rod 96 and straighten the toggle links 98 and 100. The straightening of the toggle links moves the block 86 and the heel seat lasting unit 80 carried thereby from its normal out-of-the-way position to a position adjacent the shoe and last.

Figure 24A:
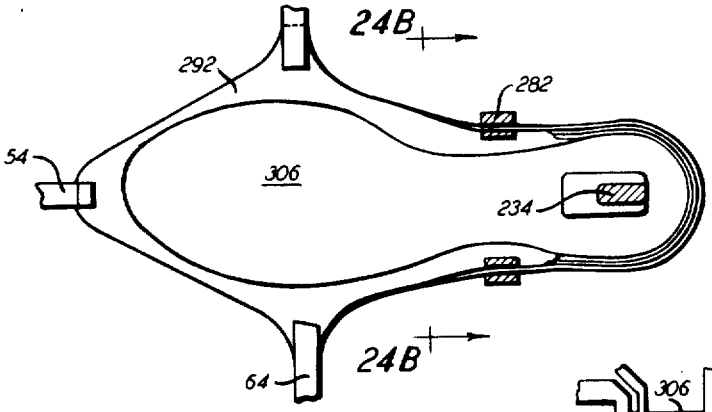
FIGURE 24A is a plan view of the shoe and last in a still later stage of the machine cycle.
Figure 24B:
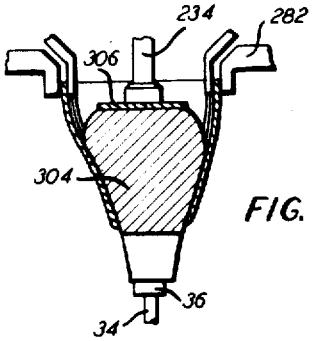
FIGURE 24B is a section taken on the line 24B—24B of FIGURE 24A.

At the time the motor 14 was actuated to raise the post 20, the margins of the upper 292 on the sides of the last moved between the open jaws of the pincers 282 at approximately the breast line of the shoe and last. Concomitantly with the actuation of the motor 94, the motors 284 are actuated to close the pincers 282 on the shoe upper at or near the breast line as indicated in FIGURES 24A and 24B.

The motors 116 are now actuated to cause the piston rods 118 to move the levers 120 and the clamping pad 140 carried thereby toward the heel of the last with the side 130 sliding in the gibs 138. During this movement, the spring 132 and 134 maintain the lever legs 124 in abutting relation and the lever legs 126 in open position until the bight 142 engages the last and shoe as indicated in dotted lines in FIGURE 25A. At this time, the bight of the pad and the slide 130 can no longer move forwardly so that continued forward movement of the piston rods 118 causes the levers 120 to swing toward each other about the pivots 128 to cause the legs 144 of the pad to move toward each other and engage the shoe as indicated in solid lines in FIGURE 25A. This arrangement provides for an initial contact of the pad 140 at the heel end of the shoe and then a progressive engagement of the pad along the sides of the shoe extending forwardly of the heel to ensure a smoothening out of any wrinkles there may be in the upper and a smooth, firm clamping of the upper against the last.

Figure 25A:
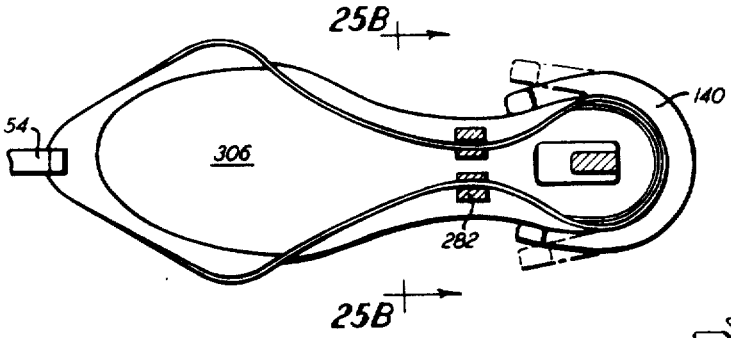
FIGURE 25A is a plan view of the shoe and last in a still later stage of the machine cycle, showing the clamping pad engaging the shoe.
Figure 25B:
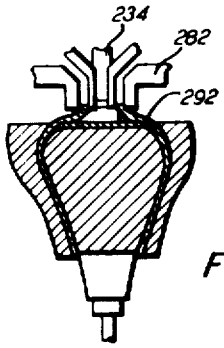
FIGURE 25B is a section taken on the line 25B—25B of FIGURE 25A.

Concomitantly with the actuation of the motors 116, the motors 268 are actuated to move the pincers 282 toward each other to lay the upper margin at the breast line down on the insole as indicated in FIGURES 25A and 25B. At the same time, the jaws of the forepart pincers 64 are opened.

The effect of the concurrent inward movement of the closed breast line pincers 282, the opening of the forepart pincers 64 and the clamping of the upper against the last by the clamping pad 140 is to cause the breast line pincers 282 to lay the upper on the insole on the breast line, so that the wipers 214 can effectively heel seat last without the upper fading away from the wipers. In addition, the inward movement of the breast line pincers serves to apply further tension to the still flaccid counter 298, to augment the tension molding force initially applied by the horizontal stretching movement of the pincers 54 and 64 in molding the counter to the shape of the last. By opening the pincers 64 as the pincers 282 move inwardly, the pincers 282 do not have the opposing outwardly directed forces of the pincers 64 on the upper to contend with. The clamping pad 140 acts to provide a compression molding force on the counter to further mold it to the shape of the last as well as clamping the upper for the subsequent wiping operation.

The motor 188 is now actuated to advance the piston rod 192, the rack 194 and the piston rod enlargement 208 to cause the wipers 214 to be moved from the dotted line position of FIGURE 26B to the solid line position and wipe or fold the margin of the upper 292 and counter 298 against the insole 306. During the wiper movement, the portion of the upper margin gripped by the breast line pincers 282 slips between the pincers to the extent necessary for the wipers to wipe the upper margin flat against the insole. The wiping pressure completes the molding of the counter and causes the counter, through the adhesive on its surfaces, to bond the wiped-in margin of the upper to the insole. The forward movement of the piston rod 192, through the links 210, causes the wipers 214 to move toward each other about the point 218. The forward movement of the piston rod 260, through the rack 194, the pinion 196, the slot 204 and the pin 206 also causes the plate 200 to move forward thereby providing a forward movement of the wipers as well as an inward movement about the point 218. Since the slot 204 extends normal to the path of movement of the piston rod 192, the movement of the slot from the rightward position of FIGURE 10 to the leftward position indicated in phantom causes the plate 200 initially to move forwardly almost as fast as the piston rod 192 and then to gradually slow down, until, towards the end of the stroke of the piston rod, the plate has substantially no forward movement. The result of this is that, initially, the wipers move forwardly with substantially no inward movement about the point 218, and, at the end of the wiper stroke, the wipers move toward each other about the point 218 with very little forward movement. This produces a wiping action where the force created by the wipers in moving across the ege of the insole 306 at any given point is substantially radial to the curvature of the insole at that point.

During the forward stroke of the piston rod 192, a lug 308 on the piston rod shifts the valve spool 310 of a valve 312 (FIGURE 10) to actuate the motor 246. Actuation of the motor 246 moves the cam 250 forwardly to present the low cam portion 258 between the rollers 238, 240 and thus causes the raising of the hold-down foot 234 as indicated in FIGURE 26A. The motor 14 now applies upward pressure by the last directly against the wipers to provide an overwiping and bedding pressure between the wipers and the wiped in margin of the upper during the latter part of the wiper stroke and also after the termination of the wiper stroke.

After the heated counter 298 has cooled sufficiently to become rigid in its molded shape to thereby cause the heel of the upper to assume a shape complementary to the heel of the last, the working phase of the machine cycle is concluded. The operator then releases the pedal 290 to release the last and shoe and return the machine parts to their original positions.

The heel pad cooling and expanding apparatus shown in FIGURE 19 is used in conjunction with the above described machine. The apparatus includes a tank 314 containing a quantity of coolant liquid, preferably a mixture of water and ethylene glycol. The coils 316 of a refrigerating unit 318 are immersed in the tank to cool the liquid below ambient temperatures. A conduit 320 extends from the tank 314 to one of the nipples 154 of the pad 140 and a conduit 322 extends from the tank to the other of the nipples 154. A pump 324 driven by a motor 326 is interposed in the conduit 320, and a valve 328, actuated by a solenoid 330 that is connected to a source of power labeled L1, L2, is interposed in the conduit 322. The valve 328 is normally open so that the continuously operating pump 324 normally forces the coolant liquid from the tank 314, through the conduit 320, through the cavity 146 of the pad 140, through the conduit 322 and back to the tank.

As described above, during the machine cycle, the motor 246 is actuated to raise the hold-down foot 234 and thereby cause pressure to be applied by the bottom of the shoe directly against the underside of the wipers. The motor 246 is actuated by pressurized air passing through a valve 332, that is opened at the appropriate time in the machine cycle, and through air lines 334 and 336 to the motor 246. At the same time as the motor 246 is actuated, the pressurized air passes from the line 334 and a line 338 to close a pressure switch 340, which pressure switch is a conventional electric switch that is normally open and is closed upon the application of a predetermined amount of fluid pressure thereto. The closing of the pressure switch 340 actuates the solenoid 330 to close the valve 328, thereby causing the pressure of the fluid in the cavity 146 to increase. This increase in pressure causes the pad wall 148 to expand against the last and shoe, which at this time are clamped by the pad, and apply a uniform conforming pressure against the shoe and last. Since the thickness of the wall 151 between the cavity 146 and the outer peripheral surface 150 of the pad and the thicknesses of the walls between the cavity and the top, bottom and forward surfaces of the pad are each greater than the thickness of the wall 149 between the cavity and the inner peripheral surface 148, since the wall 151 is encompassed by the relatively rigid shield 156 and since the tabs 158 underlie the bottom surface of the pad, substantially all of the expansive force of the liquid in the cavity will be directed inwardly by way of the wall 149 against the last and shoe. Since the liquid in the cavity 146 is below ambient temperatures, the liquid causes the counter 298 to be cooled by conduction through the wall 148 at a more rapid rate than it otherwise would be, so that the counter is more rapidly converted to its rigid state, thus enabling the shoe to be released more quickly and cutting down on the length of the machine cycle. When the pedal 290 is released as aforesaid, the air pressure in the line 338 is cut off, thereby opening the pressure switch 340, deenergizing the solenoid 330 and opening the valve 328.

Figure 20:
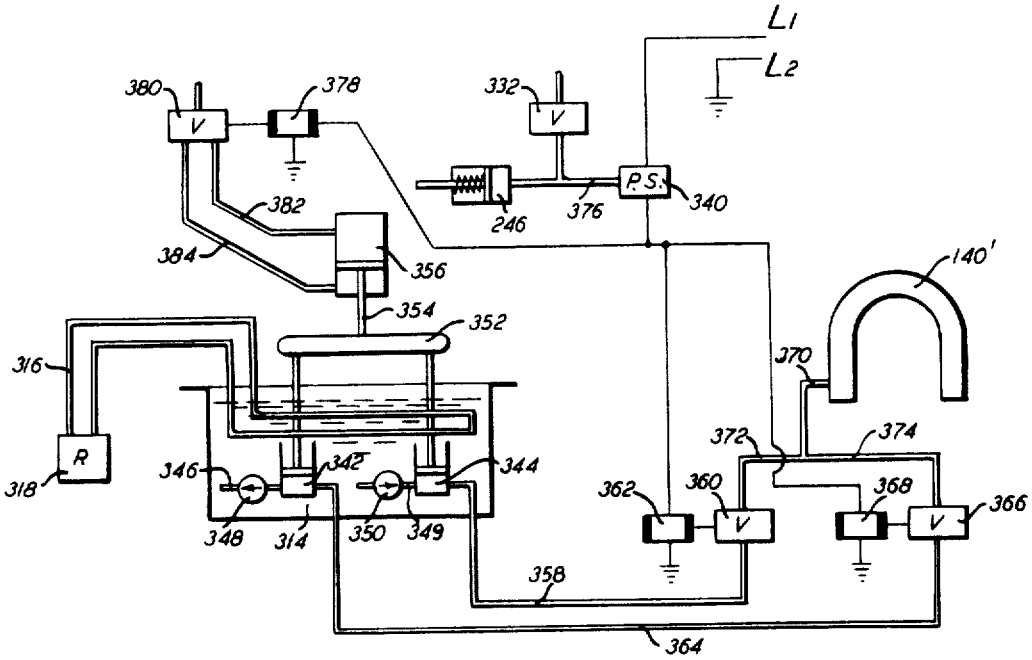
FIGURE 20 is a schematic representation of a second arrangement for forcing liquid into the clamping pad.

As an alternative to the heel pad expanding and cooling apparatus of FIGURE 19, the apparatus shown in FIGURE 20 may be used. In this arrangement, a pad 140' is utilized that has only one nipple 154 at one end of the cavity 146 and is closed at the other end of the cavity. The tank 314 is filled as before with the coolant liquid that is cooled by the immersed coils 316 of the refrigerating unit 318. A pair of plunger operating pumps 342 and 344 are immersed in the liquid in the tank. A conduit 346 extends from the pump 342 into the tank and has a check valve 348 therein that prevents liquid from going from the tank into the pump, but permits liquid to go from the pump into the tank. A conduit 349 extends from the pump 344 into the tank and has a check valve 350 therein that prevents liquid from passing from the pump into the tank but permits liquid to go from the tank into the pump. The pumps 342 and 344 are connected by way of a bar 352 to the piston rod 354 of an air actuated motor 356. A conduit 358 extends from the pump 344 to a normally closed valve 360 that is actuable to open position by a solenoid 362, and a conduit 364 extends from the pump 342 to a normally open valve 366 that is actuable to a closed position by a solenoid 368. The pad 140' has a conduit 370 connected to its nipple 154 that is connected by way of branch conduits 372 and 374 respectively to the valves 360 and 366.

When, during the machine cycle, the valve 332 is opened to actuate the motor 246 to cause the hold-down foot to be raised, the pressure switch 340 is simultaneously closed by pressurized air flowing thereto from the valve 332 by way of a conduit 376. The closing of the pressure switch simultaneously energizes the solenoids 362 and 368 and a solenoid 378. The energization of the solenoid 378 shifts a valve 380 so that pressurized air may flow from the valve 380 through a conduit 382 to the motor 356 to actuate the motor to lower the piston rod 354. The energization of the solenoids 362 and 368 respectively cause the opening of the valve 360 and the closing of the valve 366. The lowering of the piston rod 354 causes the lowering of the plungers of the pumps 342 and 344. The lowering of the plunger of the pump 344 causes coolant liquid to pass from the pump, through the conduit 358, the valve 360 and the conduits 372 and 370 into the cavity of the pad 140' to expand it with coolant liquid and provide the results discussed above with respect to the pad 140. The check valve 350 prevents the passage of liquid from the pump 344 into the tank 314 at this time. The lowering of the plunger of the pump 342 causes the liquid in the pump to be forced into the tank 314 by way of the conduit 346.

When, at the end of the machine cycle, the valve 332 is actuated to shut off the pressurized air to the motor 246 so as to return it to its idle position, the pressure switch 340 is opened to simultaneously deenergize the solenoids 362, 368 and 378. The deenergization of the solenoid 378 returns the valve 380 to its normal position, so that pressurized air flows from the valve, through a conduit 384 into the motor 356 to cause the raising of the piston rod 354 to thereby raise the plungers of the pumps 342 and 344. The deenergization of the solenoids 362 and 368 respectively return the valve 360 to its closed position and the valve 366 to its open position. The raising of the plunger of the pump 342 causes the coolant liquid to be sucked from the pad 140' through the conduits 370 and 374, the valve 366 and the conduit 364 into the pump 342 with the check valve 348 preventing liquid from entering the pump from the tank at this time. The raising of the plunger of the pump 344 causes liquid to be sucked into the pump from the tank by way of the conduit 348.

Thus it can be seen that each time the pump plungers are lowered, a charge of coolant liquid is forced from the pump 344 into the pad 140' and the liquid in the pump 342 is forced into the tank, and each time the pump plungers are raised, a charge of coolant liquid is sucked into the pump 344 from the tank and the pump 342 sucks the liquid from the pad 140' into the tank. With this arrangement, a new charge of coolant liquid is forced into the pad 140' during each machine cycle.

Figure 21:
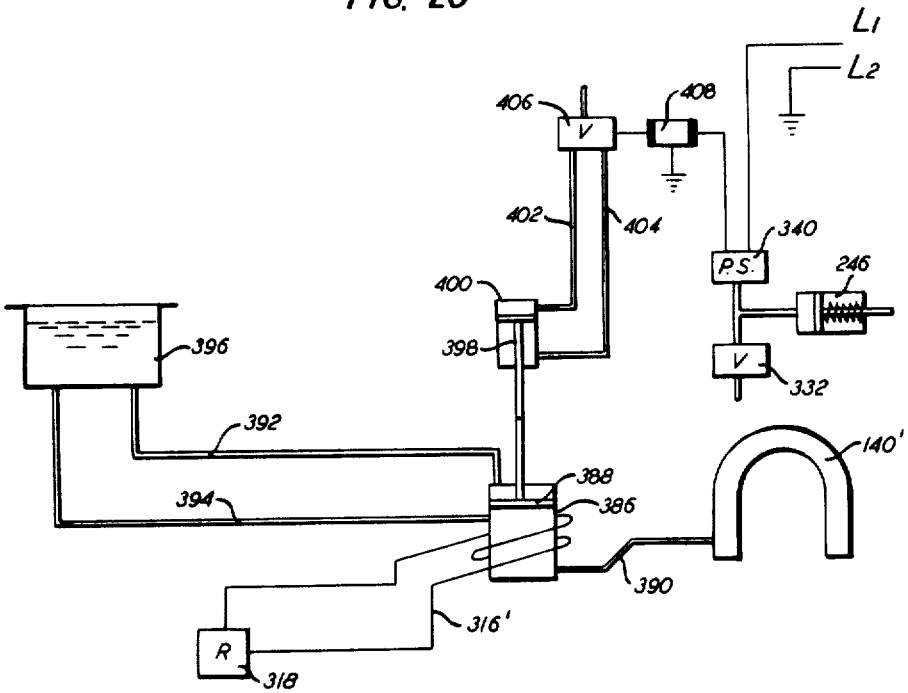
FIGURE 21 is a schematic representation of a third arrangement for forcing liquid into the clamping pad.

FIGURE 21 shows a further modification for cooling and expanding the pad. Herein, a pad 140' is utilized similar to the pad of the FIGURE 20 arrangement. There is provided a pump 386 having a plunger 388 reciprocable therein. Coils 316' connected to the refrigerating unit 318 are spiralled about the casing of the pump 386 to cool the coolant liquid in the pump, and the pump is connected to the nipple 154 of the pad by a conduit 390. Conduits 392 and 394 respectively connect the top and side of the pump to a supply tank 396 containing a supply of the liquid. The pump plunger 388 is connected to the piston rod 398 of an air actuated motor 400, and the motor 400 is connected by conduits 402 and 404 to a valve 406. The valve 406 normally connects the conduit 404 to the source of pressurized air and is actuable to connect the conduit 402 to said source by the energization of a solenoid 408.

When, during the machine cycle, the aforementioned valve 332 is opened to actuate the motor 246 to raise the hold-down foot 234, the pressure switch 340 is concomitantly closed to energize the solenoid 408 and thereby enable pressurized air to pass through the valve 406 and the line 402 to actuate the motor 400 to lower the piston rod 398 and thus lower the pump plunger 388. When the plunger passes the conduit 394 it forces the coolant liquid from the pump, through the conduit 390 into the pad 140', to thereby cool the pad and expand it against the last to provide the results described above. When, at the end of the machine cycle, the valve 332 is closed to enable the motor 246 to return to its idle position, the pressure switch 340 is opened to deenergize the solenoid 408 and thus return the valve 406 to its idle position, so that pressurized air passes through the conduit 404 to raise the piston rod 398. The raising of the piston rod 398 causes the raising of the pump plunger 388 to suck the liquid from the pad 140' back into the pump 386. The liquid above the plunger 398 is forced into the tank 396 during the rise of the plunger by way of the conduits 392 and 394, and when the plunger reaches its top position, liquid from the tank augments the liquid sucked from the pad 140' by way of the conduit 394. During the descent of the plunger 388, the liquid below the plunger is forced into the tank 396 by way of the conduit 394 until the plunger passes below the conduit 394. The tank 396 and conduits 392 and 394 replenish any liquid that may have seeped out of the pump or pad or any of the fittings used therewith during the operation of this mechanism.

It should be understood that the present disclosure is for the purpose of illustration only and that this invention includes all modifications and equivalents which fall within the scope of the appended claims. Terms such as "below," "forward" and "upwardly" are merely indicative of the relative positions and paths of movement of the parts and should be so construed.

We claim:

1. In a lasting machine having means for supporting a last having an insole on its bottom and an upper mounted thereon with a stiffener interposed between a portion of the upper and the last, said stiffener being stiff and rigid at ambient temperatures, becoming flaccid and moldable when heated a predetermined amount above ambient tempertures and reverting to its stiff and rigid state when cooled back to ambient temperatures; clamping means actuable to clamp the said portion of the upper against the last; and means for wiping the margin of said portion of the upper against the insole, the improvement comprising: means for causing said clamping means to be cooled below ambient temperatures *while said clamping means is in clamping engagement with said portion of upper* to thereby cool the stiffener and decrease the time for the stiffener to revert to its stiff and rigid state.

2. A lasting machine comprising: means for supporting a last having an insole on its bottom and an upper mounted thereon with a stiffener interposed between a portion of the upper and the last, said stiffener being stiff and rigid at ambient temperatures, becoming flaccid and moldable when heated a predetermined amount above ambient temperatures and reverting to its stiff and rigid state when cooled back to ambient temperatures; a clamping pad, having a cavity therein; means for forcing a surface of the clamping pad against said portion of the upper; means for wiping said portion of the upper against the insole; and means for providing a fluid in said clamping pad cavity that is below ambient temperatures.

3. The machine according to claim 2 wherein said clamping pad has a deformable wall between the cavity and said surface, and further comprising: means for causing the pressure of the fluid in the cavity to be raised to a sufficient degree to expand said wall.

4. The machine according to claim 3 wherein the fluid providing means comprises: a supply tank filled with liquid; refrigerating means for cooling the liquid in the tank below ambient temperatures; a first conduit extending from the tank to one end of the pad cavity; a second conduit extending from the other end of the pad cavity to the tank; a pump in said first conduit for pumping the liquid from the tank through the first conduit, the pad cavity and the second conduit back to the tank; and wherein said pressure raising means comprises a valve in said second conduit operative when actuated to stop the flow of liquid in the second conduit.

5. The machine according to claim 3 wherein said fluid providing means and fluid pressure raising means comprise: a supply tank filled with liquid; refrigerating means for cooling the liquid in the tank below ambient temperatures; pump means in the tank; conduit means extending from the pump means to the pad cavity; a rod connected to the pump means; means mounting the rod for reciprocation; means responsive to movement of the rod in a first direction to cause the pump means to force liquid from the tank through the conduit means into the pad cavity; and means responsive to movement of the rod in a second direction to cause the pump means to suck the liquid from the pad cavity through the conduit means back into the tank.

6. The machine according to claim 3 wherein said fluid providing and fluid pressure raising means comprise: a supply tank filled with liquid; refrigerating means for cooling the liquid in the tank below ambient temperatures; a first and a second pump in the tank, each pump comprising a reciprocal plunger; conduit means interconnecting each pump and the pad cavity; a rod, mounted for reciprocation, connected to both pump plungers; means responsive to movement of the rod in a first direction to move the pump plunger in their respective pumps in a first direction to force liquid from the first pump through the conduit means into the pad cavity; and means responsive to movement of the rod in a second direction to move the pump plungers in their respective pumps in a second direction to suck the liquid from the pad cavity, through the conduit means into the second pump.

7. The machine according to claim 3 wherein said fluid providing and fluid pressure raising means comprise: a pump; a plunger reciprocably mounted in the pump; a quantity of liquid in the pump; refrigerating means for cooling said liquid below ambient temperatures; conduit means interconnecting the pump and the pad cavity; means responsive to movement of the plunger in a first direction to force liquid from the pump through the conduit means into the pad cavity; and means responsive to movement of the plunger in a second direction to suck the liquid from the cavity through the conduit means back into the pump.

8. A heel seat lasting machine comprising: wiping means mounted for forward movement; a shoe support for supporting bottom-up a last having an insole located on its bottom, an upper mounted thereon with the margin of the upper at the heel of the last extending upwardly of the insole and a counter interposed between the heel portion of the upper and the last, said counter being stiff and rigid at ambient temperatures, becoming flaccid and moldable when heated a predetermined amount above ambient temperatures and reverting to its stiff and rigid state when cooled back to ambient temperatures; a clamping pad located below said wiping means having an inner surface adapted to bear against the heel of the upper and last, a cavity, and a wall between the cavity and the inner surface; means for forcing the pad against the heel of the last and upper to cause said inner surface to bear thereagainst; means for moving the wiping means forwardly to wipe said margin of the upper against the insole; means for forcing liquid into the cavity with sufficient pressure to expand said wall; and means to cool the liquid below ambient temperatures.

9. A heel seat lasting machine comprising: wiping means mounted for forward movement; a shoe support for supporting bottom-up a last having an insole located on its bottom, an upper mounted thereon with the margin of the upper at the heel of the last extending upwardly of the insole and a counter interposed between the heel portion of the upper and the last, said counter being stiff and rigid at ambient temperatures, becoming flaccid and moldable when heated a predetermined amount above ambient temperatures and reverting to its stiff and rigid state when cooled back to ambient temperatures; a substantially U-shaped clamping pad located below said wiping means having an inner surface adapted to bear against the heel of the upper and last, a cavity, and a wall between the cavity and said inner surface; a source of liquid; means for cooling the source of liquid below ambient temperatures; conduit means extending between the source of liquid and the cavity; means for forcing the pad against the heel of the last and upper to cause said inner pad surface to bear thereagainst; means for moving the wiping means forwardly to wipe said margin of the upper against the insole; and means [operatve] *operative* after the pad has been forced against the last, for forcing liquid into said cavity from said source through said conduit means with sufficient pressure to expand said wall against the upper and last.

10. A heel seat lasting machine comprising: wiping means mounted for forward movement; a shoe support for supporting bottom-up a last having a shoe mounted thereon that includes an insole located on the last bottom, an upper mounted on the last with the margin of the upper at the heel of the last extending upwardly of the insole and a counter interposed between the heel portion of the upper and the last, said counter being stiff and rigid at ambient temperatures, becoming flaccid and moldable when heated a predetermined amount above ambient temperatures and reverting to its stiff and rigid state when cooled back to ambient temperatures; a hold-down foot located forwardly of the wiping means and above the shoe support; means for normally maintaining the bottom of the hold-down foot at a level that is slightly below the bottom of the wiping means; shoe support driving means for forcing the shoe support upwardly to press the bottom of the shoe against the hold-down foot; a substantially U-shaped clamping pad located below said wiping means having an inner surface adapted to bear against the heel of the upper and last, a cavity and wall between the cavity and said inner surface; a source of liquid; means for cooling the source of liquid below ambient temperatures; conduit means extending between the source of liquid and the cavity; means for forcing the pad against the heel of the last and upper to cause said inner pad surface to bear thereagainst; means for moving the wiping means forwardly to wipe said margin of the upper against the insole; and means operative after the wiping means have commenced their forward movement to concomitantly raise the hold-down foot so that the shoe support driving means forces the bottom of the shoe against the hold-down foot and to force liquid into said cavity from said source through said conduit means with sufficient pressure to expand said wall against the upper and last.

11. In a lasting machine, heel clamping means comprising: a substantially U-shaped pad, made of an expansible, deformable material, having a bight and a pair of legs extending forwardly of the bight on opposite sides of the bight to form an inner peripheral surface and an outer peripheral surface; a cavity within the bight and legs; a deformable wall between the inner peripheral surface and the cavity; means for connecting the cavity to a source of fluid under pressure; a connector attached to and extending outwardly of the outer peripheral surface of each leg; a shield of relatively rigid material disposed about and engaging, said outer peripheral surface and mounted on said connectors; a bracket located outwardly of and adjacent each leg; joining means for connecting each bracket to the shield; and drive means connected to the brackets to move them inwardly of the pad legs; whereby the shield remains in engagement with said outer surface during the inward movement of the pad legs upon actuation of the drive means and the shield ensures that the expansive force of fluid in the pad cavity is directly inwardly against said deformable wall.

12. In a lasting machine, heel clamping means comprising: a substantially U-shaped clamping pad, made of an expansible, deformable material, having a bight and a pair of legs extending forwardly of the bight on opposite sides of the bight, to form an inner peripheral surface and an outer peripheral surface; a last support for supporting a last having a shoe upper mounted thereon and a shoe insole located on its bottom with the heel of the last facing the pad; a cavity within the bight and legs; a deformable wall between the inner peripheral surface and the cavity; means for connecting the cavity to a source of fluid under pressure; a connector attached to and extending outwardly of the outer peripheral surface of each leg; a shield of relatively rigid material disposed about and engaging said outer peripheral surface and mounted on said connectors; a bracket located outwardly of and adjacent each leg; joining means for connecting each bracket to the shield; and drive means operative to impart relative movement between the last support and the pad to cause forward movement of the pad relative to the last until the bight of the pad engages the heel of the upper and to then move the brackets inwardly of the pad; whereby the shield remains in engagement with said outer peripheral surface during the inward movement of the pad legs upon actuation of the drive means and the shield ensures that the expansive force of fluid in the pad cavity is directed inwardly against said deformable wall.

13. In a lasting machine, heel clamping means comprising: a substantially U-shaped clamping pad, made of an expansible, deformable material, having a bight and a pair of legs extending forwardly of the bight on opposite sides of the bight to form an inner peripheral surface and an outer peripheral surface; a cavity within the bight and legs; a deformable wall between the inner peripheral surface and the cavity; means for connecting the cavity to a sourc of fluid under pressure; a connector attached to and extending outwardly of the outer peripheral surface of each leg; a shield of relatively rigid material disposed about and engaging said outer peripheral surface and mounted on said connectors; a plate; a slide mounted in the plate for forward and rearward movement; a pair of levers pivotally connected to said slide for swinging movement about axes transverse to the plane of movement of the slide, said levers having legs extending forwardly and divergently from said axes; means connecting the portion of the shield opposite said pad bight to said slide; joining means connecting each lever leg to a portion of the shield that is outward of a pad leg; spring means operatively connected to said levers for yieldably urging the lever legs apart; and drive means pivotally connected to said levers between said axes and said joining means; whereby the shield remains in engagement with said outer peripheral surface during the inward movement of the pad legs upon actuation of the drive means and the shield ensures that the expansive force of fluid in the pad cavity is directed inwardly against said deformable wall.

14. The apparatus according to claim 11 further comprising: a plate located rearwardly of the shield opposite the bight of the pad; and joinlng means connecting the shield to the plate.

15. The apparatus according to claim 14 wherein said connectors are pins embedded in the pad legs that extend outwardly thereof and a slot is provided in the shield to receive each pin for mounting the shield on the pins.

*16. A lasting machine comprising: means for supporting a last having an insole on its bottom and an upper mounted thereon with a stiffener interposed between a portion of the upper and the last, said stiffener being stiff and rigid at ambient temperatures, becoming flaccid and moldable when heated a predetermined amount above ambient temperatures and reverting to its stiff and rigid state when cooled back to ambient temperatures; a clamping pad, having a cavity therein; means for forcing a surface of the clamping pad against said portion of the upper; means for wiping said portion of the upper against the insole; and means for providing a fluid in said clamping pad cavity that is below ambient temperatures while said surface of said clamping pad is forced against said portion of the upper to thereby cool the stiffener and decrease*

*he time for the stiffener to revert to its stiff and rigid tate.*

*17. The machine according to claim 16 wherein said lamping pad has a deformable wall between the cavity nd said surface, and further comprising: means for causng the pressure of the fluid in the cavity to be raised to sufficient degree to expand said wall.*

*18. The machine according to claim 17 wherein the luid providing means comprises: a supply tank filled with iquid; refrigerating means for cooling the liquid in the ank below ambient temperatures; a first conduit extendng from the tank to one end of the pad cavity; a second conduit extending from the other end of the pad cavity to the tank; a pump in said first conduit for pumping the liquid from the tank through the first conduit, the pad cavity and the second conduit back to the tank; and wherein said pressure raising means comprises a valve in said second conduit operative when actuated to stop the flow of liquid in the second conduit.*

*19. The machine according to claim 17 wherein said fluid providing means and fluid pressure raising means comprise: a supply tank filled with liquid; refrigerating means for cooling the liquid in the tank below ambient temperatures; pump means in the tank; conduit means extending from the pump means to the pad cavity; a rod connected to the pump means; means mounting the rod for reciprocation; means responsive to movement of the rod in a first direction to cause the pump means to force liquid from the tank through the conduit means into the pad cavity; and means responsive to movement of the rod in a second direction to cause the pump means to suck the liquid from the pad cavity through the conduit means back into the tank.*

*20. The machine according to claim 17 wherein said fluid providing and fluid pressure raising means comprise: a supply tank filled with liquid; refrigerating means for cooling the liquid in the tank below ambient temperatures; a first and a second pump in the tank, each pump comprising a reciprocal plunger; conduit means interconnecting each pump and the pad cavity; a rod, mounted for reciprocation, connected to both pump plungers; means responsive to movement of the rod in a first direction to move the pump plunger in their respective pumps in a first direction to force liquid from the first pump through the conduit means into the pad cavity; and means responsive to movement of the rod in a second direction to move the pump plungers in their respective pumps in a second direction to suck the liquid from the pad cavity, through the conduit means into the second pump.*

*21. The machine according to claim 17 wherein said fluid providing and fluid pressure raising means comprise:*

*a pump; a plunger reciprocably mounted in the pump; a quantity of liquid in the pump; refrigerating means for cooling said liquid below ambient temperatures; conduit means interconnecting the pump and the pad cavity; means responsive to movement of the plunger in a first direction to force liquid from the pump through the conduit means into the pad cavity; and means responsive to movement of the plunger in a second direction to suck the liquid from the cavity through the conduit means back into the pump.*

*22. A heel seat lasting machine comprising: wiping means mounted for forward movement; a shoe support for supporting bottom-up a last having an insole located on its bottom, an upper mounted thereon with the margin of the upper at the heel of the last extending upwardly of the insole and a counter interposed between the heel portion of the upper and the last, said counter being stiff and rigid at ambient temperatures, becoming flaccid and moldable when heated a predetermined amount above ambient temperatures and reverting to its stiff and rigid state when cooled back to ambient temperatures; a clamping pad located below said wiping means having an inner surface adapted to bear against the heel of the upper and last, a cavity, and a wall between the cavity and the inner surface; means for forcing the pad against the heel of the last and upper to cause said inner surface to bear thereagainst; means for moving the wiping means forwardly to wipe said margin of the upper against the insole; means for forcing liquid into the cavity with sufficient pressure to expand said wall while said inner surface of the pad is in bearing engagement with the heel of the upper; and means to cool the liquid below ambient temperatures to thereby cool the counter and decrease the time for the counter to revert to its stiff and rigid state.*

References Cited

The following references, cited by the Examiner, are of record in the patented file of this patent or the original patent.

UNITED STATES PATENTS

| | | | |
|---|---|---|---|
| 1,822,039 | 9/1931 | Kinney | 12—8.1 X |
| 2,108,859 | 2/1938 | Kamborian | 12—8.2 |
| 2,304,575 | 12/1942 | Klyce | 12—1 |
| 2,339,774 | 1/1944 | Eppler | 12—14.4 X |
| 2,406,738 | 9/1946 | Brophy | 12—53.5 |
| 3,051,968 | 9/1962 | Meier | 12—8.2 |
| 3,138,810 | 6/1964 | Becker | 12—14.4 X |

PATRICK D. LAWSON, *Primary Examiner.*